United States Patent
Wilks

(10) Patent No.: US 10,363,881 B2
(45) Date of Patent: Jul. 30, 2019

(54) AUTOMOBILE ROOF RAIL AND SEAL SYSTEM

(71) Applicant: Dura Operating, LLC, Auburn Hills, MI (US)

(72) Inventor: Patrick Lee Wilks, Rochester Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/608,114

(22) Filed: May 30, 2017

(65) Prior Publication Data

US 2018/0345870 A1    Dec. 6, 2018

(51) Int. Cl.
| | | |
|---|---|---|
| B60R 9/04 | (2006.01) | |
| B60R 9/048 | (2006.01) | |
| B60R 13/06 | (2006.01) | |
| B60R 9/052 | (2006.01) | |
| B60R 9/058 | (2006.01) | |
| B60R 9/00 | (2006.01) | |

(52) U.S. Cl.
CPC ............... *B60R 9/048* (2013.01); *B60R 9/04* (2013.01); *B60R 9/052* (2013.01); *B60R 9/058* (2013.01); *B60R 13/06* (2013.01); *B60R 9/00* (2013.01)

(58) Field of Classification Search
CPC ........... B60R 9/04; B60R 9/048; B60R 9/058; B60R 13/06; B60J 10/27; B60J 10/36
USPC ................................ 224/325–327, 316, 309
See application file for complete search history.

(56) References Cited

U.S. PATENT DOCUMENTS

| | | | | |
|---|---|---|---|---|
| 1,874,535 | A * | 8/1932 | Hughes | B60R 9/065 190/28 |
| 4,901,902 | A * | 2/1990 | Stapleton | B60R 9/04 224/326 |
| 7,401,395 | B2 * | 7/2008 | Unger | B60R 9/04 29/451 |
| 2006/0001290 | A1 * | 1/2006 | Hammaker | B60J 10/72 296/146.15 |
| 2006/0082189 | A1 * | 4/2006 | Sultan | B60J 10/248 296/146.9 |

(Continued)

FOREIGN PATENT DOCUMENTS

| | | |
|---|---|---|
| CN | 205905901 U | 1/2017 |
| DE | 3942795 A1 | 7/1991 |

(Continued)

OTHER PUBLICATIONS

English Translation of JP 2014083878, obtained from espacenet.com.*

*Primary Examiner* — Scott T McNurlen
(74) *Attorney, Agent, or Firm* — Robert E. Ford; Raymond J. Vivacqua; Steven L. Crane

(57) ABSTRACT

An automobile roof rail system includes a rail having opposed first and second side walls defining a cavity between the first and second side walls. A retention feature is provided with each of the first side wall and the second side wall. A resilient material first seal is engaged at a first end with the retention feature of the first side wall, and a resilient material second seal is engaged at a first end with the retention feature of the second side wall. A living hinge separates a free second end of each of the first seal and the second seal from the first end. The free second end of each of the first seal and the second seal is directed into the cavity in an as-molded condition.

20 Claims, 4 Drawing Sheets

(56) References Cited

U.S. PATENT DOCUMENTS

2014/0117723 A1 5/2014 Slack
2017/0015253 A1 1/2017 Shibata et al.

FOREIGN PATENT DOCUMENTS

| DE | 4343093 | B4 | | 2/2006 | |
|----|---------|----|----|--------|---|
| FR | 2811623 | A1 | * | 1/2002 | ............ B60R 13/04 |
| JP | 2006282119 | A | | 10/2006 | |
| JP | 2014083878 | A | * | 5/2014 | |
| JP | 2015009603 | A | | 1/2015 | |
| JP | 2016155487 | A | | 9/2016 | |
| WO | 2014154688 | A1 | | 10/2014 | |

* cited by examiner

AUTOMOBILE ROOF RAIL AND SEAL SYSTEM

FIELD

The present disclosure relates generally to automobile vehicle roof rails and seals for automobile vehicle roof rails.

BACKGROUND

The statements in this section merely provide background information related to the present disclosure and may or may not constitute prior art.

Automobile vehicles commonly add pairs of rails, racks or moldings, each hereinafter collectively referred to as a "rail" to permit items such as luggage or light weight construction materials to be temporarily supported from the vehicle roof or trunk lid. Known rails are attached using fasteners for connection to a roof or trunk lid, and seals are used to prevent moisture and dirt entry at the fastener locations or other areas of the vehicle roof or trunk lid covered by the rail. Seals are also located as desired for visual aesthetics to preclude a gap being visible where the rail meets the generally curved or locally indented geometry of the roof or trunk lid. Known seals do not provide gap closure while preventing the seal from protruding from the rail, resulting in the material of the seal extending visually outwardly of the rail at a junction between the rail and the roof or trunk lid.

Thus, while current vehicle rails and seals achieve their intended purpose, there is a need for a new and improved system and method for extruding and sealing vehicle rails.

SUMMARY

According to several aspects, an automobile roof rail system includes a rail having at least one side wall. A retention feature is provided with the at least one side wall. A resilient material seal engaged at a first end with the retention feature. A living hinge separates a free second end of the seal from the first end of the seal.

In another aspect of the present disclosure, the at least one side wall includes a first side wall and a second side wall defining a cavity between the first side wall and the second side wall.

In another aspect of the present disclosure, the cavity is sized to receive a raised gusset of a roof portion of a vehicle in a rail installed position on the roof portion, the second end of the seal contacting the roof portion and the gusset in the rail installed position.

In another aspect of the present disclosure, the retention feature defines a female slot extending longitudinally in the at least one side wall.

In another aspect of the present disclosure, the female slot defines a dovetail shape, and wherein a male portion of the seal is frictionally received in and retained by the female slot, the male portion of the seal having a shape matching the dovetail shape of female slot.

In another aspect of the present disclosure, the retention feature defines a male member extending into the cavity.

In another aspect of the present disclosure, the seal includes a female cavity having a shape matching an outer surface of the male member, wherein the male member is frictionally received in the female cavity of the seal.

In another aspect of the present disclosure, the at least one side wall includes an end face spaced freely away from the roof portion with the rail in a rail installed position on a vehicle roof portion.

In another aspect of the present disclosure, no portion of the seal extends outwardly with respect to a vertical plane contacting an outer corner of the at least one side wall at the end face.

In another aspect of the present disclosure, the seal comprises a resilient material having a first durometer in the first end and a second durometer lower than the first durometer in the second end.

According to several aspects, an automobile roof rail system includes a rail having opposed first and second side walls defining a cavity between the first and second side walls. A retention feature is provided with each of the first side wall and the second side wall. A resilient material first seal is engaged at a first end with the retention feature of the first side wall, and a resilient material second seal is engaged at a first end with the retention feature of the second side wall. Each of the first seal and the second seal have a free second end, the free second end of each of the first seal and the second seal directed into the cavity in an as-molded condition.

In another aspect of the present disclosure, each of the first seal and the second seal include a living hinge separating the free second end of each of the first seal and the second seal from the first end of the first seal and the second seal.

In another aspect of the present disclosure, each of the first seal and the second seal include a transition portion which transitions in thickness from the first end to the free end.

In another aspect of the present disclosure, each of the first seal and the second seal include an upwardly curved deflecting end connected to the transition portion using the living hinge.

In another aspect of the present disclosure, the retention feature defines a female slot extending longitudinally in each of the first and the second side walls.

In another aspect of the present disclosure, the female slot defines a dovetail shape, and wherein a male portion of the first seal and the second seal is frictionally received in and retained by the female slot, the male portion of the seal having a shape matching the dovetail shape of the female slot.

In another aspect of the present disclosure, the retention feature defines a male member extending from each of the first and the second side walls into the cavity; and the first seal and the second seal each include a female cavity having a shape matching an outer surface of the male member of one of the first or second side walls, wherein each male member is frictionally received in the female cavity of one of the first seal or the second seal.

According to several aspects, an automobile roof rail system includes a metal rail having opposed first and second side walls defining a cavity between the first and second side walls. A retention feature is provided with each of the first side wall and the second side wall. A resilient material first seal is engaged at a first end with the retention feature of the first side wall, and a resilient material second seal is engaged at a first end with the retention feature of the second side wall. Each of the first seal and the second seal have a living hinge separating a free second end of each of the first seal and the second seal from the first end of the first seal and the second seal. The free second end of each of the first seal and the second seal in an as-molded condition are directed into the cavity and define a curved shape having a convex surface facing downward toward a roof portion of a vehicle. Each of the first side wall and the second side wall include an end face spaced freely away from the roof portion of the vehicle with the rail in a rail installed position on the vehicle roof portion, with no portion of the first seal extending outwardly of the first side wall in the rail installed position and no portion of the second seal extending outwardly of the second side wall in the rail installed position.

In another aspect of the present disclosure, a durometer of the first seal and the second seal varies from the first end to the second end.

In another aspect of the present disclosure, the cavity is sized to receive a raised gusset of the roof portion of the vehicle in the rail installed position, the second end of the seal contacting both the roof portion and the gusset in the rail installed position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
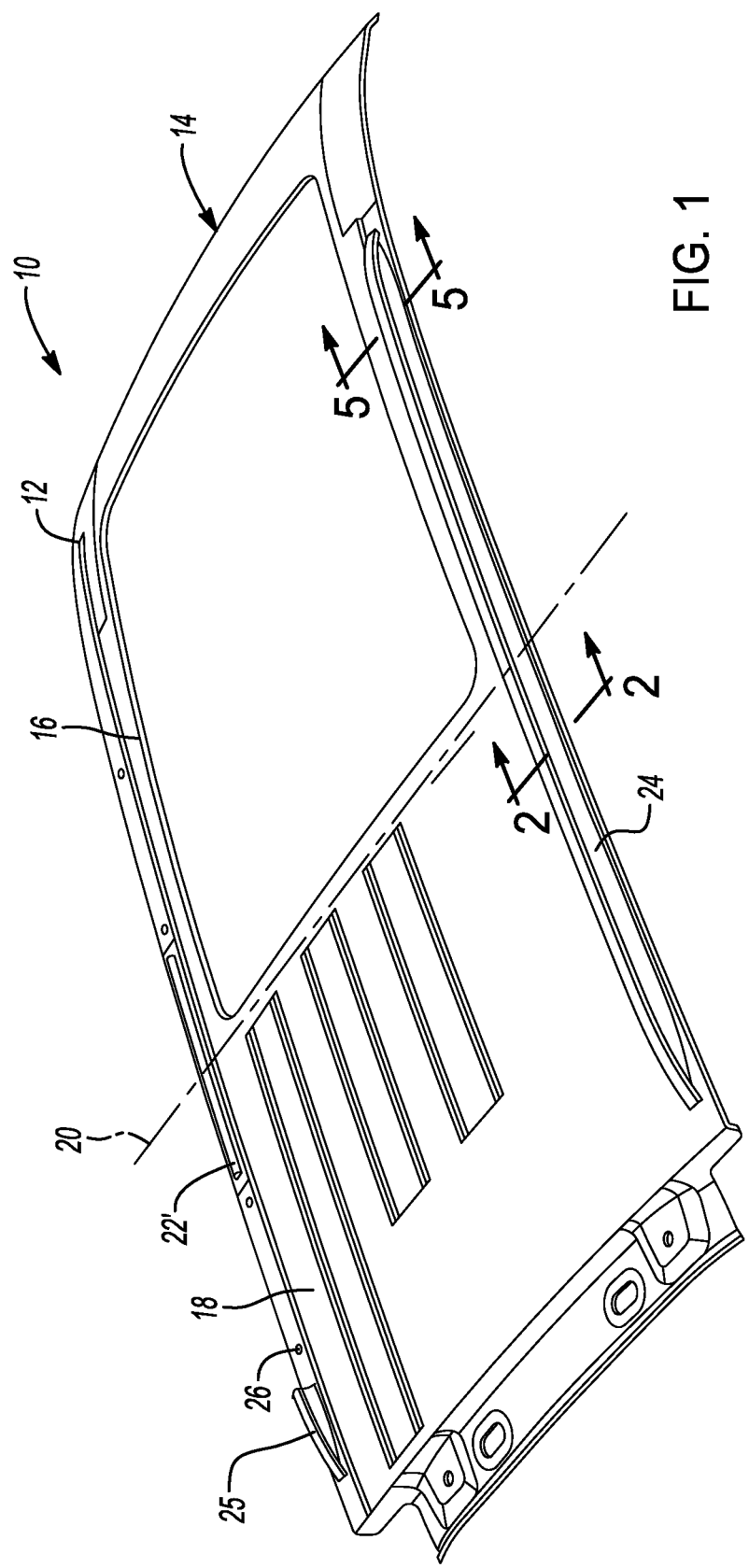
FIG. 1 is a top left perspective view of an automobile vehicle having a roof rail system according to an exemplary embodiment.

Referring to FIG. 1, an automobile motor vehicle 10 includes a body 12 having a front windshield portion 14, and a moon-roof opening 16 positioned in a roof portion 18. Due to the large amount of roof material omitted to allow space for the moon-roof opening 16 and the mechanism associated with the moon-roof (not shown for clarity), stress risers may occur in the material of the roof portion 18 along a junction line 20 located between the moon-roof opening 16 and the roof portion 18 at both outside ends of the junction line 20. To reduce or eliminate the stress risers, a raised first gusset 22, hidden in this view under a first roof rail 24, is created proximate an outside directed passenger side end of the junction line 20, and a second gusset 22' is created proximate an outside directed driver side end of the junction line 20.

The first roof rail 24 may be mounted to the roof portion 18 on a passenger side of the roof portion 18 using multiple fasteners 26. A second roof rail 25, only partially visible in this view to provide visibility of the second gusset 22', which is generally a mirror image configuration of the first roof rail 24, is mounted to the roof portion 18 on a driver side of the roof portion 18 also using multiple fasteners 26. The first roof rail 24 and the second roof rail 25 are configured to fit over the first and second gussets 22, 22' as will be discussed in greater detail in reference to FIG. 2.

Referring to FIG. 2 and again to FIG. 1, only the first roof rail 24 is shown, however it should be evident the second roof rail 25 includes similar features, which are therefore not discussed in further detail herein. The first roof rail 24 may be formed as an extrusion from a metal including steel or aluminum, and includes a first side wall 28 and a second side wall 30 each joined by an outer cross member 32 oriented substantially parallel to a plane of the roof portion 18, and an inner cross member 34. According to several aspects, the first side wall 28 can be oriented at an angle alpha ($\alpha$) with respect to the outer cross member 32 and therefore to the roof portion 18, while the second side wall 30 may be oriented substantially perpendicular to the roof portion 18. A cavity 36 is created between the first side wall 28, the second side wall 30, and the inner cross member 34 which provides internal clearance space for receipt of the first gusset 22 when the first roof rail 24 is in its installed position shown on the roof portion 18.

End faces of the first side wall 28 and the second side wall 30 such as an end face 38 are spaced above the roof portion 18 by a clearance gap 40 to avoid direct physical contact between the metal of the roof rails and the roof portion 18, which is commonly protected using a paint layer. The clearance gap 40 is predetermined by a length of the fasteners 26 used to install the first roof rail 24, shown and described in reference to FIG. 1. At least one and according to several aspects a first seal 42 and a second seal 44 are positioned within the cavity 36 between the first roof rail 24 and the roof portion 18. A portion of the first seal 42 and the second seal 44 may also be positioned in the clearance gap 40. Specifically, a portion of the first seal 42 and the second seal 44 may be interposed between the end face 38 and the roof portion 18 to provide sealing between the rail 24 and the first roof rail 24.

Each of the first seal 42 and the second seal 44 are designed to preclude any portion of the seals from extending outwardly with respect to an exterior surface of the first side wall 28 or the second side wall 30 when the first roof rail 24 is in the installed position. For example, the first seal 42 is designed to preclude any portion of the first seal 42 from extending outwardly with respect to a vertical plane 46 contacting an outer corner 48 of the first side wall 28 at the free end face 38. Similarly, the second seal 44 is designed to preclude any portion of the second seal 44 from extending outwardly with respect to a vertical plane 50 defining an outer face 52 of the second side wall 30.

According to several aspects, the first seal 42 includes at a first end a female slot 54 frictionally receiving and retained onto a male retention feature defining a male member 56. According to several aspects, the male member 56 extends inwardly into the cavity 36 and is integrally created on an inner wall of the first side wall 28. According to several aspects, the male member 56 may define a dovetail shape or have a similar bulbous shape, with the female slot 54 having a geometry and size to matingly receive the male member 56 to frictionally retain the first seal 42. The first seal 42 may be installed onto the male member 56 after manufacture of the first roof rail 24, which can be manufactured for example using an extrusion process. The first seal 42 may be installed onto the male member 56 by sliding the first seal 42 longitudinally, or by press fit of the female slot 54 over the male member 56. The first seal 42 further includes a second end defining a free end 58 which is positioned in the cavity 36. The free end 58 is curved or hook-shaped allowing the free end 58 to directly contact each of the roof portion 18 and a first face 60 of the first gusset 22. In the installed position of the first roof rail 24 shown, no portion of the first seal 42 extends outwardly of the plane 46, and therefore no portion of the first seal 42 extends outwardly of the rail.

The second seal 44 similarly includes at a first end a female slot 62 frictionally receiving and retained onto a male retention feature defining a male member 64. According to several aspects, the male member 64 extends inwardly into the cavity 36 and is integrally created on an inner wall of the second side wall 30. Similar to the male member 56, the male member 64 may define a bulbous male or dovetail shape, or a similar shape, with the female slot 62 having a geometry to fit over or onto the male member 64 to help retain the second seal 44. A free end 66 of the second seal 44 is hook-shaped and oppositely directed with respect to the free end 58 of the first seal 42 such that the free end 66 directly contacts each of the roof portion 18 and a second face 68 of the first gusset 22. In its installed position shown, no portion of the second seal 44 extends outwardly of the plane 50, and therefore no portion of the second seal 44 extends outwardly of the rail.

Figure 2:
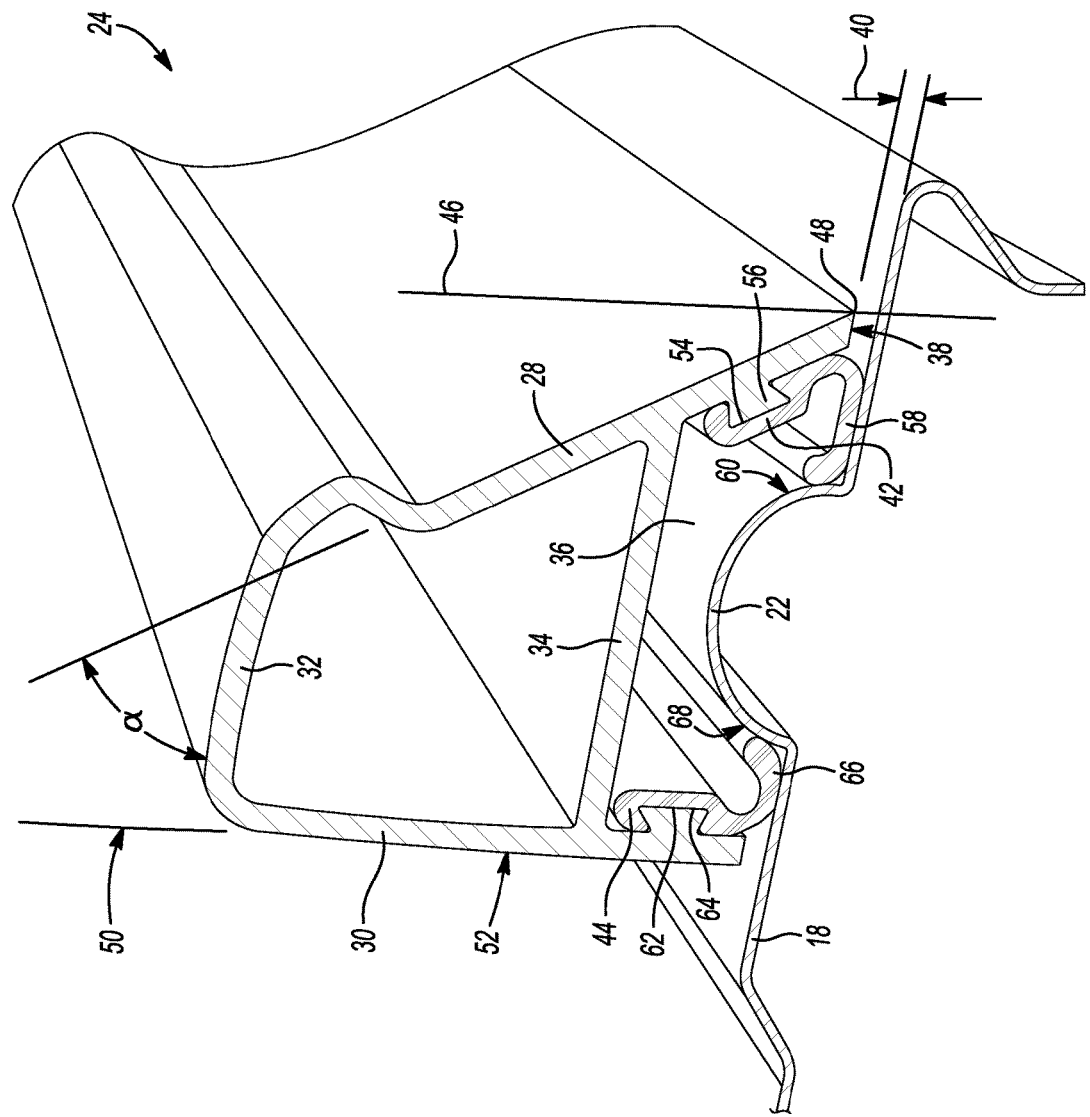
FIG. 2 is a cross sectional left perspective view taken at section 2 of FIG. 1.

Referring to FIG. 3 and again to FIGS. 1 and 2, the first seal 42 is shown in its relaxed, as-molded configuration after installation onto the male member 56, but prior to installation of the first roof rail 24 onto the roof portion 18. The second seal 44 may be of similar size, or smaller, but is similar in geometry and is therefore not further discussed herein. The free second ends 58, 66 of each of the first seal 42 and the second seal 44 are directed into the cavity 36 in their as-molded condition prior to deflection upon installation. A first end 70 having the female slot 54 of the first seal 42 may be bulbous shaped, having a thickness greater than the free end 58 to promote deflection in the free end 58 upon installation of the first roof rail 24. The free end 58 includes a transition portion 72 which transitions in thickness from the thicker first end 70 to the free end 58 which is thinner than the first end 70. A deflecting end 74 is connected to the transition portion 72 using a living hinge 76. The living hinge 76 initiates bending and deflection of the free end 58 when the deflecting end 74 contacts the roof portion 18 of the automobile motor vehicle 10.

During installation the first roof rail 24 including the first side wall 28 are displaced in a vertical downward direction 78 until the deflecting end 74 contacts the roof portion 18. The deflecting end 74 is curve-shaped having a convex surface 80 directed toward the roof portion 18 such that as the deflecting end 74 contacts the roof portion 18 further downward displacement in the vertical downward direction 78 causes bending of the free end 58 in a counterclockwise arc of rotation direction 82 which initiates and is enhanced at the living hinge 76. The deflecting end 74 can also deflect further in the rotation direction 82 as the deflecting end 74 further contacts the first face 60 of the first gusset 22 as shown in FIG. 2.

Figure 3:
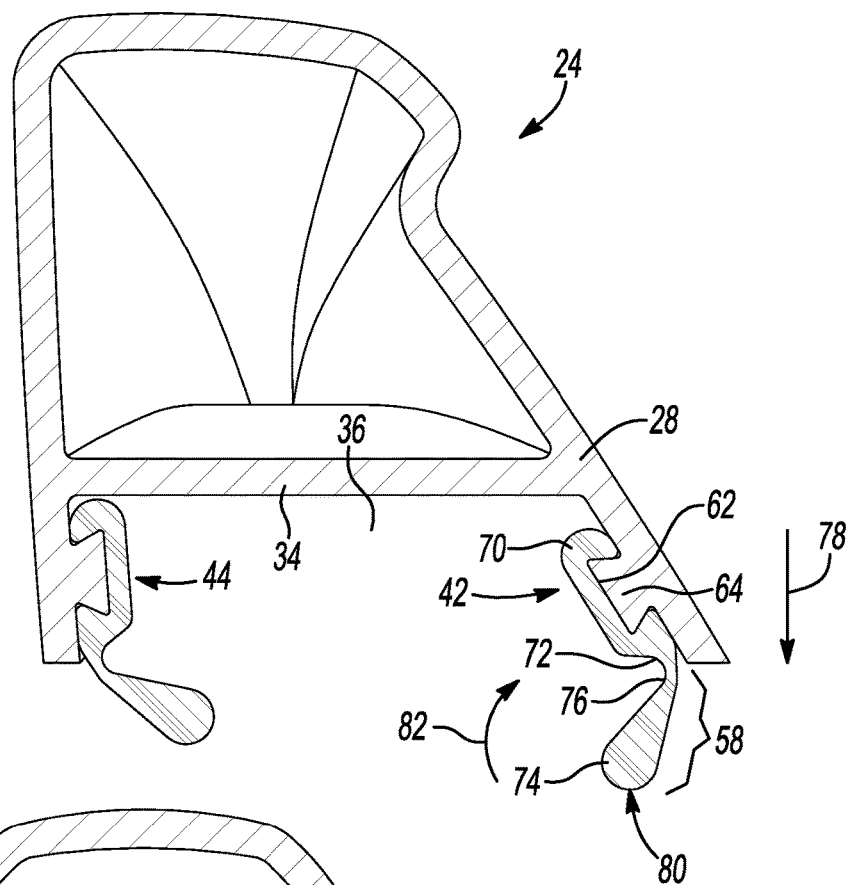
FIG. 3 is a cross sectional end elevational view of the rail of FIG. 2 having the vehicle roof portion removed for clarity.

With continuing reference to both FIGS. 2 and 3, in the installed position of the first roof rail 24 (shown in FIG. 2), the deflecting end 74 therefore provides direct sealing contact with the roof portion 18 in areas of the roof portion 18 lacking the first gusset 22, and provides direct sealing contact to both the roof portion 18 and the first gusset 22 when the first gusset 22 is present.

Figure 4:
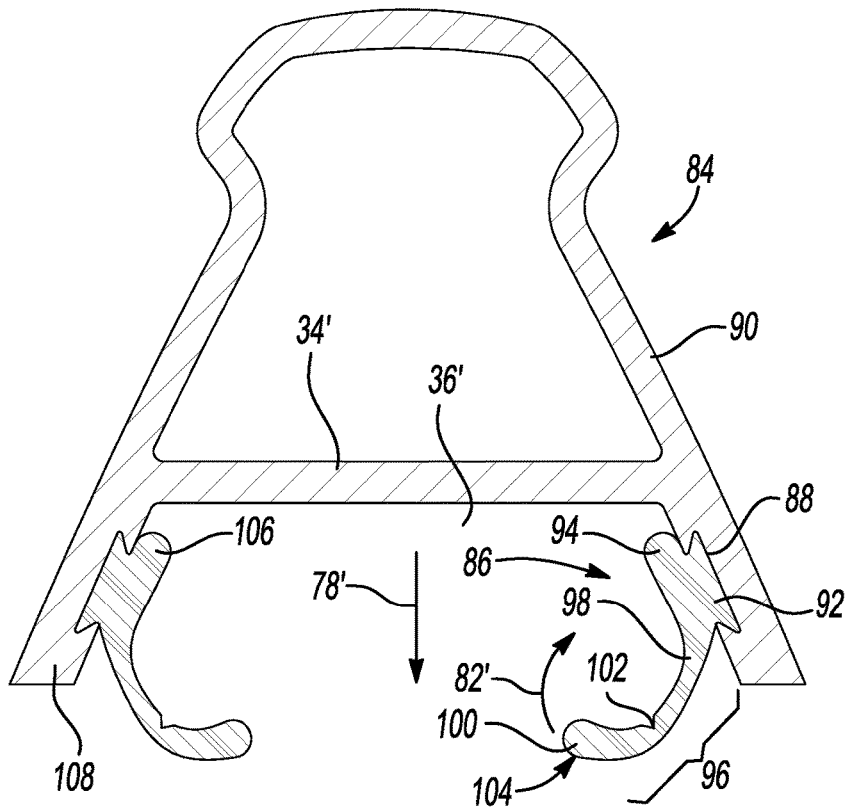
FIG. 4 is a cross sectional end elevational view modified from FIG. 3 to show another aspect of the seals of the present disclosure.
Figure 5:
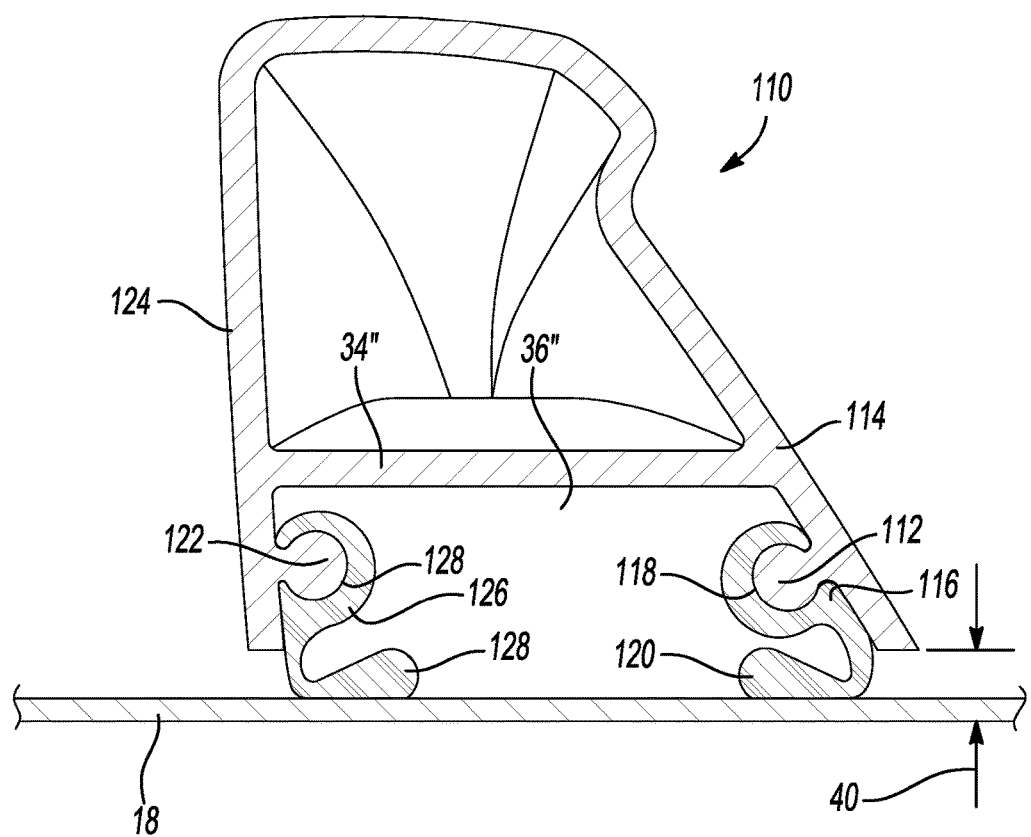
FIG. 5 is a cross sectional end elevational view taken at section 5 of FIG. 1.

Referring to FIG. 4 and again to FIGS. 2 and 3, according to several aspects, a roof rail 84 is modified from the first roof rail 24 and includes a third seal 86 in lieu of the first seal 42. The roof rail 84 includes a female shaped slot 88 created in a first side wall 90 in lieu of the male member 64 extending from the first side wall 28. The third seal 86 includes a male member 92 integrally extending from a bulbous first end 94. According to several aspects, the female shaped slot 88 may have a dovetail shape, or a similar bulbous shaped. The male member 92 of the third seal 86 is oppositely shaped to fill and match the geometry of the female shaped slot 88. The roof rail 84 further includes a fourth seal 106 similar in design but oppositely directed with respect to the third seal 86. The fourth seal 106 is connected to a second side wall 108.

A second end 96 of the third seal 86 has a bulbous shape extending inwardly into a cavity 36' of the roof rail 84. The third seal 86 is shown in its relaxed, as-molded configuration prior to installation of the roof rail 84. The third seal 86 incudes a second end 96 With the retention member or male member 92 received in the female slot 88, the third seal 86 functions similar to the first seal 42, and therefore includes a transition portion 98 similar in shape and function as the transition portion 72. A deflecting end 100 is similar in shape and function to the deflecting end 74. A living hinge 102 is positioned between the transition portion 98 and the deflecting end 100 and functions the same as the living hinge 76.

The deflecting end 100 is curve-shaped having a convex surface 104 directed toward the roof portion 18 such that as the deflecting end 100 contacts the roof portion 18, further downward displacement in the vertical downward direction 78' causes bending of the free end 96 in the counterclockwise arc of rotation direction 82' which initiates and is enhanced at the living hinge 102. A fourth seal, not shown, having similar but oppositely directed features as the third seal 86, can be used as a substitute for the second seal 44.

It is noted that each of the seals of the present disclosure such as the first seal 42, the second seal 44, the third seal 86 and the fourth seal 106 are individually mechanically and frictionally connected to one of the inner side walls of the rails proximate to a bottom end of the side walls which pre-positions the seals proximate to the rail contact location with the roof portion of the vehicle when the rails are in an installed position. This allows a free end of the seals to contact the roof portion and to deflect as required to contact the roof portion, a raised gusset if present, or to seal proximate to locations where fasteners are used to connect the rail to the roof portion. The seals of the present disclosure are therefore capable of creating a seal along an entire length of each seal for any geometry of the roof portion or connecting structure, and in the rail installed position no portion of the seal extends outwardly of the rail.

In addition to the male or female dovetail geometry of the seals shown in FIGS. 2 through 6, seals of the present disclosure can also include other mechanical connection shapes. These shapes include but are not limited to round or curved, rectangular, square, or other geometric shape, bulbous, channel, ribs and the like.

Referring to FIG. 5 and again to FIGS. 1 and 2, over a majority of the length of the rails where the rails contact the roof portion 18, there is no raised gusset of the roof portion 18, and there is no fastener 26 present. An exemplary rail 110 is shown in one of these areas of the roof portion 18 also separated by the clearance gap 40 above the roof portion 18. The rail 110 is modified from the rail 24 to include a rounded or bulbous first male member 112 integrally connected to a first side wall 114 and extending into a cavity 36". A fifth seal 116 is modified from the first seal 42 to include a female slot 118 sized to frictionally receive the first male member 112. A free end 120 of the fifth seal 116 is similar to the free end 58, and is shown in direct sealing contact with the roof portion 18.

The rail 110 is further modified from the rail 24 to include a rounded or bulbous second male member 122 integrally connected to a second side wall 124 and extending into the cavity 36". A sixth seal 126 is modified from the second seal 44 to include a female slot 128 sized to frictionally receive the second male member 122. A free end 128 of the sixth seal 126 is similar to the free end 66 of the second seal 44, and is shown in direct sealing contact with the roof portion 18. The rail 110 therefore provides the fifth and sixth seals 116, 126 which can deflect to directly contact and create a seal with only the roof portion 18. The fifth and sixth seals 116, 126 can also deflect similar to the first and second seals 42, 44 shown in FIG. 2 to directly contact the raised gusset 22 where the raised gusset 22 is present.

According to several aspects, the first and second seals 42, 44, the third and fourth seals 84, 106, and the fifth and sixth seals 116, 126 are formed from a resilient material such as a rubber, a thermoplastic elastomer (TPE) or a similar polymeric material providing flexibility and sealing capability. An exemplary material of the seals is a thermoplastic vulcanizate (TPV). The seals can be made using a molding process or using an extrusion process providing for a cross section of the seals to be constant throughout a length of each of the seals. According to further aspects, a durometer of the seals of the present disclosure can be uniform throughout the entire body and length of the seal. According to further aspects, a durometer of the seals of the present disclosure can vary in different locations of the seals. For example, a first durometer material may be used in the seal at the location of the female slots 54, 62, 118, 128 or at the male members 92, while a second durometer material lower than the durometer of the first durometer material may be used at the free ends 58, 66, 96, 120, 128 to enhance flexibility and sealing.

An automobile roof rail system of the present disclosure offers several advantages. These include a seal engaged by a retention feature of at least one side wall of a rail, the seal having a living hinge to enhance bending as the seal engages a roof portion and a gusset of the roof portion when present. The retention feature can include a female dovetail shaped slot or a male extending member integrally connected to the side wall. The living hinge in conjunction with an upwardly curving free end of the seal enhances sealing contact while precluding any portion of the seal from extending outwardly of the rail in the rail installed position.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile roof rail system, comprising:
    a rail having a first side wall and a second side wall joined by a cross member with a cavity positioned between the first side wall and the second side wall and the cross member and extending downward from and in line with the first side wall and the second side wall;
    a retention feature integrally provided with each of the first side wall and the second side wall, the retention feature of each of the first side wall and the second side wall having an engagement member defining a male member formed within the cavity below the cross member and extending into the cavity and facing each other and facing into the cavity, the male member being thinner where connected to the first side wall or the second side wall than in a portion of the male member spaced away from the first side wall or the second side wall;
    first and second resilient material seals including a female cavity having a shape matching an outer surface of the male member, wherein the male member is frictionally received in the female cavity of the seals, the seals engaged at a first end with the male member of the retention feature of the first side wall and the second side wall, the first seal frictionally and positively engaged with the first side wall and the second seal frictionally and positively engaged with the second side wall, both seals positioned entirely between the first side wall and the second side wall and facing each other; and
    a living hinge separating a free second end of each seal from the first end of each seal, the free second end of each seal freely positioned in the cavity.

2. The automobile roof rail system of claim 1, wherein the free second end of each seal is freely suspended in the cavity after engaged coupling of the first end of the seal with the retention feature, and prior to installation of the rail onto a vehicle roof raised gusset.

3. The automobile roof rail system of claim 2, wherein the rail when positioned over the raised gusset of a roof portion of a vehicle in a rail installed position on the roof portion receives the raised gusset within the cavity, the raised gusset causing the second end of the seal to deflect thereby contacting both the roof portion and the gusset in the rail installed position.

4. The automobile roof rail system of claim 1, wherein the first and second side wall includes an end face spaced freely away from a roof portion of a vehicle with the rail in a rail installed position on a vehicle roof portion.

5. The automobile roof rail system of claim 4, wherein no portion of the seals extend outwardly with respect to a vertical plane contacting an outer corner of the first and second side walls at the end face.

6. The automobile roof rail system of claim 1, wherein the seals comprise a resilient material having a first durometer in the first end and a second durometer lower than the first durometer in the second end.

7. The automobile roof rail system of claim 1, wherein the male member has a rounded shape.

8. The automobile roof rail system of claim 1, wherein the seals contact an inner surface of the side wall above and below the male member.

9. The automobile roof rail system of claim 1, wherein the seals do not contact the cross member.

10. An automobile roof rail system, comprising:
    a rail having opposed first and second side walls joined by a cross member defining a cavity between the first and second side walls and the cross member and extending downward from and in line with the first side wall and the second side wall;
    a retention feature provided with each of the first side wall and the second side wall below the cross member and facing into the cavity and facing each other;
    an engagement member of the retention feature defining a male member formed within the cavity below the cross member and extending into the cavity and facing each other and facing into the cavity, the male member being thinner where connected to the first side wall or the second side wall than in a portion of the male member spaced away from the first side wall or the second side wall;
    a resilient material first seal matingly engaged at a first end with the engagement member of the retention feature of the first side wall, and a resilient material second seal matingly engaged at a first end with the engagement member of the retention feature of the second side wall, each of the first seal and the second seal including a female cavity having a shape matching an outer surface of the male member; and each of the first seal and the second seal having a free second end, the free second end of each of the first seal and the second seal facing each other and directed into the cavity in an as-molded condition after mating engagement onto the retention feature, but prior to installation of the rail onto a vehicle roof portion.

11. The automobile roof rail system of claim 10, wherein each of the first seal and the second seal include a living hinge separating the free second end of each of the first seal and the second seal from the first end of the first seal and the second seal.

12. The automobile roof rail system of claim 11, wherein each of the first seal and the second seal include a transition portion which transitions in thickness from the first end to the second end.

13. The automobile roof rail system of claim 12, wherein each of the first seal and the second seal include an upwardly curved deflecting end connected to the transition portion using the living hinge.

14. The automobile roof rail system of claim 10, wherein the second end of the first and second seal defines a bulbous shape.

15. The automobile roof rail system of claim 10, wherein the first and second seal includes a deflecting end proximate to the second end connected to the first end by a transition portion which is thinner than the first end and the second end.

16. The automobile roof rail system of claim 10, wherein the male member of the first side wall is integrally connected to the first side wall and the male member of the second side wall is integrally connected to the second side wall.

17. The automobile roof rail system of claim 10, wherein the second end of the first and second seal defines a hook-shape.

18. An automobile roof rail system, comprising:
a metal rail having opposed first and second side walls joined by a cross member defining a cavity between the first and second side walls and under the cross member and extending downward from and in line with the first side wall and the second side wall;
a retention feature provided with each of the first side wall and the second side wall below the cross member and facing into the cavity and facing each other;
an engagement member of the retention feature defining a male member formed within the cavity below the cross member and extending into the cavity and facing each other and facing into the cavity, the male member being thinner where connected to the first side wall or the second side wall than in a portion of the male member spaced away from the first side wall or the second side wall;
a resilient material first seal matingly engaged at a first end with the retention feature of the first side wall, and a resilient material second seal matingly engaged at a first end with the retention feature of the second side wall;
each of the first seal and the second seal including a female cavity having a shape matching an outer surface of the male member;
each of the first seal and the second seal having a living hinge separating a free second end of each of the first seal and the second seal from the first end of the first seal and the second seal;
the free second end of each of the first seal and the second seal in an as-molded condition directed into the cavity and facing each other and defining a curved shape having a convex surface facing downward toward and in contact with a raised gusset extending upward from a roof portion of a vehicle with the raised gusset received in the cavity; and
each of the first side wall and the second side wall include an end face spaced freely away from the roof portion of the vehicle with the rail in a rail installed position on the vehicle roof portion, with no portion of the first seal extending outwardly of the first side wall in the rail installed position and no portion of the second seal extending outwardly of the second side wall in the rail installed position.

19. The automobile roof rail system of claim 18, wherein a durometer of the first seal and the second seal varies from the first end to the second end.

20. The automobile roof rail system of claim 18, wherein the second end of the first seal and the second seal contacts both the roof portion and the gusset in the rail installed position.

* * * * *